Figure 1:
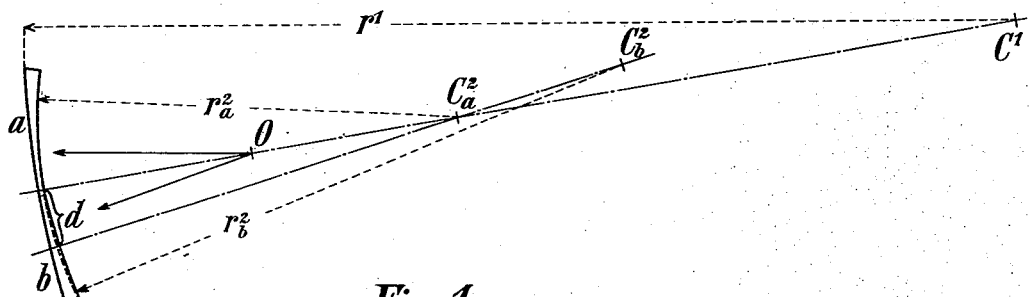

M. VON ROHR.
BIFOCAL SPECTACLE GLASS.
APPLICATION FILED JAN. 25, 1910.

968,081.

Patented Aug. 23, 1910.

Witnesses:
Paul Krüger
Richard Hahn

Inventor:
Moritz von Rohr

UNITED STATES PATENT OFFICE.

MORITZ VON ROHR, OF JENA, GERMANY, ASSIGNOR TO THE FIRM OF CARL ZEISS, OF JENA, GERMANY.

BIFOCAL SPECTACLE-GLASS.

968,081.  Specification of Letters Patent.  Patented Aug. 23, 1910.

Application filed January 25, 1910. Serial No. 540,035.

*To all whom it may concern:*

Be it known that I, MORITZ VON ROHR, a citizen of the German Empire, residing at Carl-Zeiss-Strasse, Jena, in the Grand Duchy of Saxe-Weimar, Germany, have invented a new and useful Bifocal Spectacle-Glass, of which the following is a specification.

The invention consists in a homogeneous bifocal spectacle glass, both the primary and the secondary lens of which are to a satisfactory extent corrected for astigmatism. To attain this object, there has been employed for the primary lens a well known spectacle glass, which has the form of a collective or dispersive meniscus of such a curvature that it is sufficiently corrected for distant objects as to astigmatism. Astigmatic correction of this kind can be held to have been attained, at least approximately, when the radius of the convex surface measured in millimeters can be represented as a fraction the numerator of which is 1000 and the denominator of which is the sum of two terms, one being the power of the spectacle glass in dioptries—positive in collective lenses, negative in dispersive lenses—and the other having a positive value between 10 and 25. It is obvious that such a spectacle glass can be equipped with a secondary lens for near objects, e. g., for use in reading, by replacing a part of one of the two refractive surfaces by a third refractive surface, which in virtue of its suitable curvature, forms together with the opposite part of the unrestricted surface, the secondary lens of the power desired. As always the primary lens is designed for distance vision, the secondary lens for near vision, there belongs to a collective primary lens a still more collective secondary lens and to a dispersive primary lens a secondary lens which is less dispersive or even slightly collective. Hence, whether the primary lens be collective or dispersive, the third surface must deviate, from that part of the one primary lens surface which it is substituted for, toward the air side, covering that part in some manner with an additional collective lens.

The requirement that the secondary lens be likewise sufficiently corrected for astigmatism is, according to the present invention, fulfilled by bringing the vertex of the collective lens supposed to have been added so near to the axis of the primary lens that the distance between both amounts at the most to 10 mm. This vertex is located where the straight line determined by the center of curvature of the third surface and by the center of curvature of the second surface, that surface of the primary lens which surrounds the third surface, pierces the third surface. With such an arrangement of the secondary lens, the primary lens can in general no more be used in its axis, because the locus of its vertex lies in the secondary lens. But in view of the existing astigmatic correction it is unobjectionable to make use, for distance vision, of a field of the spectacle glass above the axis of the primary lens, that is to say, so to place the spectacle glass in front of the eye that the axis of its primary lens, while passing as usual about through the center of rotation of the eye, is directed downward.

As to the astigmatic correction of the secondary lens, it will not be equally good, as can be presumed from the first, with the two possible arrangements of the third surface, on the concave or the convex side of the meniscus. The investigations made in developing the invention have proved this and have at the same time shown, that in this regard the collective and the dispersive menisci have contrary qualities. There results as a uniform rule, that the better astigmatic correction of the secondary lens is attained, when the second surface, which surrounds the third one, is more curved than the first surface, which is common to both lenses.

Figure 2:
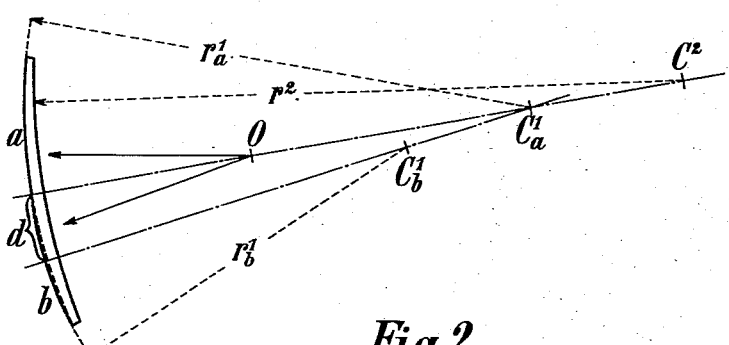

In the annexed drawing: Figure 1 is a diagram of a bifocal spectacle glass for myopes constructed according to the invention. Fig. 2 is a diagram of a bifocal spectacle glass for hypermetropes constructed according to the invention.

The dispersive primary lens of the spectacle glass shown in Fig. 1 has a power of 6 dioptries, whereas the likewise dispersive secondary lens has 3 dioptries. In Fig. 2 both lenses are collective, the power of the primary lens being 2 dioptries and that of the secondary lens 5 dioptries. The center of rotation O of the eye lying about 2.5 cm. behind the spectacle glass is supposed to be situated in the axis of the primary lens. The two arrow lines issuing from this point indicate the two median directions of sight, which exist in using the primary (upper) lens $a$ and the secondary (lower) lens $b$. The position of the axis of the primary lens is determined by the centers of curvature of the two surfaces of the primary lens, in Fig. 1 by $C^1$ for the radius $r^1$ of the common outer or first surface and by $C^2{}_a$ for the radius $r^2{}_a$ of the inner or second surface, in Fig. 2 by $C^2$ for the radius $r^2$ of the common inner or first surface and by $C^1{}_a$ for the radius $r^1{}_a$ of the outer or second surface. The third surface is produced in Fig. 1 by the radius $r^2{}_b$ from the center $C^2{}_b$, in Fig. 2 by the radius $r^1{}_b$ from the center $C^1{}_b$. That part of the second surface which has been replaced by the third surface is indicated by a dotted line for the purpose of showing the additional collective lens which would be bounded by the said part and the third surface. As the axis of this supposed additional lens is determined in Fig. 1 by the centers $C^2{}_a$ and $C^2{}_b$, and in Fig. 2 by the centers $C^1{}_a$ and $C^1{}_b$, its vertex has the distance $d$ from the axis of the primary lens.

In the first example the following measures have been chosen: $r^1=117.7$, $r^2{}_a=49.8$, $r^2{}_b=70.1$, $d=7.0$ mm. The corresponding measures of the second example are: $r^2=77.0$, $r^1{}_a=60.0$, $r^1{}_b=44.7$, $d=7.0$ mm. The radius of the outer surface of the primary lens, $r^1$ in Fig. 1 and $r^1{}_a$ in Fig. 2, realizes in both cases the condition stipulated in the first paragraph for a satisfactory astigmatic correction of the primary lens. Moreover, the feature that the curvature of the second surface exceeds that of the first surface, being the condition of a more complete correction of astigmatism in the secondary lens, has been embodied in both examples.

I claim:

1. A homogeneous meniscal spectacle glass which comprises a primary lens for distant objects and a secondary lens for near objects, both corrected for astigmatism, and which has on one side a first surface common to both lenses and on the other side a primary lens surface and a secondary lens surface, this third surface being surrounded by the second surface, the three centers of curvature lying on the same side of the glass and the straight line, determined by the centers of curvature of the second and the third surface, piercing the third surface at a distance of 10 mm. at most from the axis of the primary lens.

2. A homogeneous meniscal spectacle glass which comprises a primary lens for distant objects and a secondary lens for near objects, both corrected for astigmatism, and which has on one side a first surface common to both lenses and on the other side a primary lens surface and a secondary lens surface, this third surface being surrounded by the second surface, the second surface being more curved than the first one, the three centers of curvature lying on the same side of the glass and the straight line, determined by the centers of curvature of the second and the third surface, piercing the third surface at a distance of 10 mm. at most from the axis of the primary lens.

MORITZ VON ROHR.

Witnesses:
 PAUL KRÜGER,
 ALFRED MACKEDANZ.